United States Patent [19]

Doyle et al.

[11] Patent Number: 6,025,092
[45] Date of Patent: Feb. 15, 2000

[54] FLUORINATED IONOMERS AND THEIR USES

[75] Inventors: Christopher Marc Doyle, Newark; William Brown Farnham, Hockessin; Andrew Edward Feiring; Peter Arnold Morken, both of Wilmington; Mark Gerrit Roelofs, Hockessin, all of Del.

[73] Assignee: E. I. du Pont de Nemours and Company, Wilmington, Del.

[21] Appl. No.: 09/023,244

[22] Filed: Feb. 13, 1998

[51] Int. Cl.[7] .......................... H01M 4/60; C25B 11/04; C08F 16/24

[52] U.S. Cl. ..................... 429/213; 204/291; 526/243; 526/247; 526/255; 528/401

[58] Field of Search ............................ 252/500; 204/242, 204/280, 291; 526/243, 247, 255; 528/401; 521/25, 27; 429/212, 213; 428/320.2

[56] References Cited

U.S. PATENT DOCUMENTS

| | | | |
|---|---|---|---|
| 3,282,875 | 11/1966 | Connolly et al. | 260/29.6 |
| 4,330,654 | 5/1982 | Ezzell et al. | 526/243 |
| 4,358,545 | 11/1982 | Ezzell et al. | 521/27 |
| 4,940,525 | 7/1990 | Ezzell et al. | 204/252 |
| 5,418,091 | 5/1995 | Gozdz et al. | |
| 5,595,676 | 1/1997 | Barnes et al. | 252/62.2 |
| 5,672,438 | 9/1997 | Banerjee et al. | 429/33 |

FOREIGN PATENT DOCUMENTS

| | | | |
|---|---|---|---|
| 0 345 964 | 12/1989 | European Pat. Off. | C08L 27/12 |
| 63-284128 | 10/1998 | Japan | H01M 10/40 |

OTHER PUBLICATIONS

Hietala et al, *J. Mater. Chem.*, 7, 721–726, 1997.

W. W. Schmiegel, *Die Angewandte Makromolekulare Chemie*, 76/77, 39, 1979.

Y. Sone et al., *J. Electrochem. Soc.*, 143(4), 1254, 1996.

*Primary Examiner*—Mark Kopec

[57] ABSTRACT

This invention concerns substantially fluorinated, but not perfluorinated, ionomers consisting of a polyethylene backbone having pendant groups of fluoroalkoxy sulfonic acids and metal salts thereof. Such ionomers are useful for electrochemical applications.

29 Claims, No Drawings

FLUORINATED IONOMERS AND THEIR USES

FIELD OF THE INVENTION

This invention concerns ionomers comprising a substantially fluorinated, but not perfluorinated, polyethylene backbone having pendant groups of fluoroalkoxy sulfonic acids and the metal salts thereof, and with the uses of said ionomers in electrochemical applications such as batteries, fuel cells, electrolysis cells, ion exchange membranes, sensors, electrochemical capacitors, and modified electrodes.

BACKGROUND OF THE INVENTION

Copolymers of vinylidene fluoride (VDF) with vinyl alkoxy sulfonyl halides are known in the art.

The disclosures in Ezzell et al. (U.S. Pat. No. 4,940,525) encompass copolymers of VDF with vinyl ethoxy sulfonyl fluorides containing one ether linkage. Disclosed is a process for emulsion polymerization of tetrafluoroethylene (TFE) with the vinyl ethoxy comonomer.

Banerjee et al. (U.S. Pat. No. 5,672,438) disclose copolymers of VDF with vinyl alkoxy sulfonyl fluorides containing more than one ether linkage.

Connolly et al. (U.S. Pat. No. 3,282,875) disclose the terpolymer of VDF with perfluorosulfonyl fluoride ethoxy propyl vinyl ether (PSEPVE) and hexafluoropropylene (HFP). They broadly teach an emulsion polymerization process said to be applicable to copolymerization of vinyl ethers with any ethylenically unsaturated comonomer, with greatest applicability to fluorinated monomers.

Barnes et al. (U.S. Pat. No. 5,595,676) disclose "substantially fluorinated" copolymers of a vinyl ether cation exchange group-containing monomer with a "substantially fluorinated" alkene. The copolymer is produced by controlled addition of the alkene in emulsion polymerization, followed by hydrolysis in NaOH. PSEPVE/TFE copolymers are exemplified.

Hietala et al., J. Mater. Chem. Volume 7 pages 721–726, 1997, disclose a porous poly(vinylidene fluoride) on to which styrene is grafted by exposing the PVDF to irradiation. The styrene functionality is subsequently functionalized to sulfonic acid by exposure of the polymer to chlorosulfonic acid. The resultant acid polymer, in combination with water, provides a proton-conducting membrane.

Formation of ionomers and acid copolymers by hydrolysis of the sulfonyl fluoride functionality in copolymers of TFE and fluoro alkoxy sulfonyl fluorides is well known in the art. The art teaches exposure of the copolymer to strongly basic conditions.

See for example, Ezzell et al. U.S. Pat. No. 4,940,525, wherein is used 25 wt % NaOH(aq) for 16 hours at 80–90° C.; Banerjee et al. U.S. Pat. No. 5,672,438, wherein is used 25 wt % NaOH for 16 hours at 90° C., or, in the alternative, an aqueous solution of 6–20% alkali metal hydroxide and 5–40% polar organic liquid (e.g., DMSO) for 5 minutes at 50–100° C.; Ezzell et al. U.S. Pat. No. 4,358,545 wherein is used 0.05N NaOH for 30 minutes for 50° C.; Ezzell et al. U.S. Pat. No. 4,330,654, wherein is used 95% boiling ethanol for 30 minutes followed by addition of equal volume of 30% NaOH (aq) with heating continued for 1 hour; Marshall et al. EP 0345964 A1, wherein is used 32 wt % NaOH (aq) and methanol for 16 hours at 70° C., or, in the alternative, an aqueous solution of 11 wt % KOH and 30 wt % DMSO for 1 hour at 90° C.; and, Barnes et al. U.S. Pat. No. 5,595,676, wherein is used 20 wt % NaOH (aq) for 17 hours at 90° C.

Because of its high dielectric constant, high electrochemical stability, and desirable swelling properties, poly (vinylidene fluoride) is known in the art of lithium batteries as a highly desirable material for use as a membrane separator, For example Gozdz et al. (U.S. Pat. No. 5,418, 091) disclose porous PVDF homopolymer and copolymer containing solutions of lithium salts in aprotic solvents useful as separators in lithium batteries.

Porous membranes of the type described by Gozdz, however, conduct both the cation and the anion back and forth across the separator, and are thus subject to concentration polarization during use, which degrades the performance of the battery in which it is used. So-called single ion conducting polymeric membranes, wherein the ionic salt is attached to the polymer backbone, thereby immobilizing either the cation or the anion, offer a solution to the concentration polarization problem, and are known in the art. One particularly well-known such single ion conducting polymer is Nafion® Perfluoroionomer Resin and Membranes available from DuPont, Wilmington, Del. Nafion is a copolymer of TFE and perfluoro(3,6-dioxa-4-methyl-7-octenesulfonyl fluoride) which has been hydrolyzed by treatment with an alkali metal hydroxide according to the teachings of the art as hereinabove described.

It is further known in the art, and hereinbelow shown, that PVDF homopolymers and copolymers are subject to attack by strong bases such as the alkali metal hydroxides taught in the art hereinabove cited. Of particular importance is that the attack of basic nucleophiles on a copolymer of VDF and perfluorovinyl ethers results in the removal of the vinyl ether moiety from the polymer, see W. W. Schmiegel in Die Angewandte Makromolekulare Chemie, 76/77 pp 39ff, 1979. Since the highly preferred monomer species taught in the art, and exemplified by DuPont's Nafion and similar products, for imparting ionomeric character to various polymers is a vinyl ether terminated by a sulfonyl halide functionality, the sensitivity to base attack of the VDF copolymer formed therewith has prevented the development of a single-ion conducting ionomer based upon VDF. There simply is no means taught in the art for making the ionomer.

SUMMARY OF THE INVENTION

The present invention solves this long-standing problem. This invention provides for an ionomer comprising monomer units of VDF and a perfluoro-alkenyl monomer having an ionic pendant group represented by the formula:

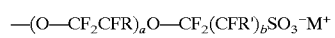

wherein R and R' are independently selected from F, Cl or a perfluorinated alkyl group having 1 to 10 carbon atoms, a=0, 1 or 2, b=0 to 6, and M is H or a univalent metal.

The present invention further provides for a functionalized olefin of the formula

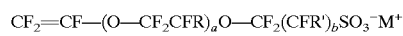

where R and R' are independently selected from F, Cl or a perfluorinated alkyl group having 1 to 10 carbon atoms, a=0, 1 or 2, b=0 to 6 and M is a univalent metal.

The present invention further provides for a process for forming an ionomer, the process comprising
  contacting a polymer comprising
    monomer units of VDF and a perfluoroalkenyl monomer having a pendant group of the formula

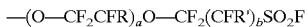

wherein R and R' are independently selected from F, Cl or a perfluorinated alkyl group having 1 to 10 carbon atoms, a=0, 1 or 2, b=0 to 6, with a suspension or solution of an alkali metal salt for a period of time sufficient to obtain the degree of conversion desired to the alkali metal sulfonate form of the polymer.

The present invention further provides for an ionically conductive composition comprising the polymer of the invention and a liquid imbibed therewithin.

The present invention further provides for an electrode comprising at least one electrode active material, the ionomeric polymer of the present invention mixed therewith, and a liquid imbibed therewithin.

The present invention further comprises an electrochemical cell comprising a positive electrode, a negative electrode, a separator disposed between the positive and negative electrodes, and a means for connecting the cell to an outside load or source wherein at least one of the group consisting of the separator, the cathode, and the anode, comprises the conductive composition of the invention.

DETAILED DESCRIPTION OF THE INVENTION

For the purposes of description in the present invention, the generic term "ionomer" will be taken to encompass the metal sulfonate and the sulfonic acid forms of the polymer of the invention.

In a surprising aspect of the present invention, a non-destructive method has been discovered for hydrolyzing the sulfonyl fluoride in a polymer comprising monomer units of VDF and a perfluoroalkenyl monomer having a pendant group of the formula

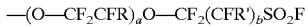

to form the ionomer of the invention the ionomer being a polymer comprising monomer units of VDF and an ionic perfluoroalkenyl monomer having a pendant group of the formula

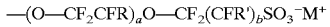

where R and R' are independently selected from F, Cl or a perfluorinated alkyl group having 1 to 10 carbon atoms, a=0, 1 or 2, b=0 to 6, and M is H or a univalent metal. Preferably, R is trifluoromethyl, R' is F, a=0 or 1, b=1, and M is H or an alkali metal. Most preferably, a=1 and M is Li.

In a further surprising aspect of the present invention, the same non-destructive method is applicable to hydrolyzing a functionalized olefin of the formula

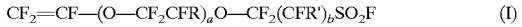 (I)

to form the ionic olefin of the present invention, the ionic olefin having the formula

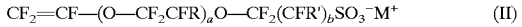 (II)

where R and R' are independently selected from F, Cl or a fluorinated, preferably perfluorinated, alkyl group having 1 to 10 carbon atoms, a=0, 1 or 2, b=0 to 6. Preferably R is trifluoromethyl, R' is F, a=1 and b=1, and M is a univalent metal.

The ionomer of the invention can be formed by first copolymerizing a non-ionic monomer (I) with VDF followed by hydrolysis to form the ionomer of the invention, or, alternatively, by first hydrolyzing monomer (I) to form the ionic monomer of the invention (II), followed by polymerization with VDF to form the ionomer of the invention. The process of first polymerizing followed by hydrolysis is preferred for operational simplicity.

A preferred hydrolysis process of the invention comprises contacting the sulfonyl fluoride-containing monomer or polymer with a mixture of alkali metal carbonate and methanol (optionally containing another solvent such as dimethyl carbonate), in the range of ca. 0–85° C., preferably room temperature to 65° C. for a sufficient length of time to convert the desired percentage of sulfonyl fluorides to the related metal sulfonate. The alkali metal carbonate is selected to provide the cation desired for the intended application. Suitable alkali metal carbonates include $Li_2CO_3$, $Na_2CO_3$, and $K_2CO_3$, with $Li_2CO_3$ most preferred.

Generally preferred are the mildest hydrolysis conditions possible consistent with timely conversion of the sulfonyl fluoride into the ionic form desired. The severe hydrolysis conditions taught in the art for hydrolyzing sulfonyl fluoride to sulfonate cause degradation of the VDF-containing copolymer. The degree of conversion can be conveniently monitored by the disappearance of the characteristic infrared absorption band for the sulfonyl fluoride group at about 1470 $cm^{-1}$. Alternatively, $^{19}F$ NMR spectroscopy may be used as described in the examples.

The ionomers of the invention include copolymer compositions in which the ionic monomer unit is present in the ionomer of the invention at concentrations ranging from 1 to 50 mol %, preferably 2–20 mol %. The preferred ionomers comprise 80–98 mol % of monomer units of VDF and 2–20 mol % of perfluoro(3,6-dioxa-4-methyl-7-octene lithium sulfonate).

Other cationic forms of the ion-exchange membrane can be achieved using ion-exchange procedures commonly known in the art (see for example Ion Exchange by F. Helfferich, McGraw Hill, N.Y. 1962). For example, the protonic form of the membrane is preferably obtained by immersing the alkali metal-ionomer into an aqueous acid.

Silver and copper sulfonate ionomers can be made by ion exchange with the alkali metal sulfonate form of the polymer. For example, repeated treatment of the lithium sulfonate ionomer with an aqueous solution of a silver salt such as silver fluoride or silver perchlorate would produce at least a partially cation exchanged silver sulfonate ionomer. In a similar fashion, the cuprous sulfonate ionomer can be produced by repeated treatment of the alkali metal sulfonate ionomer with an aqueous acidic solution of a copper salt such as cuprous chloride.

In many applications, the ionomer is preferably formed into a film or sheet. Films of the ionomer may be formed according to processes known in the art. In one embodiment, the thermoplastic sulfonyl fluoride precursor is extrusion melt cast onto a cooled surface such as a rotating drum or roll, whence it is subject to hydrolysis according to the process hereinabove described. In a second embodiment, the sulfonyl fluoride precursor is dissolved in a solvent, the solution cast onto a smooth surface such as a glass plate using a doctor knife or other device known in the art to assist in depositing films on a substrate, and the resultant film subject to hydrolysis. In a third embodiment, the sulfonyl fluoride copolymer resin is subject to hydrolysis by dissolution or suspension in a hydrolyzing medium, followed by optional addition of cosolvent, and filtration or centrifugation of the resulting mixture, and finally solvent casting of the ionomer solution onto a substrate using a doctor knife or other device known in the art to assist in depositing films on a substrate. In a fourth embodiment, the ionic comonomer (II) and VDF are copolymerized as hereinbelow described, preferably in water, and the resultant polymer deposited upon a substrate using a doctor knife or other device known in the art.

It is found in the practice of the present invention that a thin film of the sulfonyl-fluoride-containing copolymer exhibits a tendency to dissolve during hydrolysis when the concentration of the sulfonyl fluoride moiety exceeds about 5 mol-%. Thus for the purpose of achieving better control over the film forming process, it is found preferable to suspend the non-ionic sulfonyl fluoride-containing precursor polymer in a solvent or combination of solvents such as, methanol, dimethyl carbonate, or mixtures thereof, also containing the hydrolyzing agent, preferably $Li_2CO_3$ thereby hydrolyzing the polymer in solution. The thus hydrolyzed polymer is then cast as a film from solution.

The ionomer of the present invention, however formed, exhibits a low level of ionic conductivity in the dry state, at room temperature, typically ca. $10^{-6}$ S/cm. It may be combined with a liquid to achieve higher levels of ionic conductivity. Depending upon the requirements of the application, the ionomer will be in the acid form or the metal salt form, the particular metal being determined by the application as well. The liquid employed therewith will likewise be dictated by the application. In general terms, it has been found in the practice of the invention that conductivity of the liquid-containing ionomer increases with increasing % weight uptake, increasing dielectric constant, and increasing lewis basicity of the liquid, while conductivity has been observed to decrease with increasing viscosity and increasing molecular size of the liquid employed. Of course, other considerations come into play as well. For example, excessive solubility of the ionomer in the liquid may be undesirable. Or, the liquid may be electrochemically unstable in the intended use.

One particularly preferred embodiment comprises the lithium ionomer combined with aprotic solvents, preferably organic carbonates, which are useful in lithium batteries. It is in lithium batteries that the particularly useful attributes of the ionomer of the invention are particularly noteworthy. High solvent uptake characteristic of VDF polymers results in desirably high ionic conductivity in the solvent-swollen membrane. Furthermore the VDF imparts highly desirable electrochemical stability in the lithium battery environment.

It is found in the practice of the invention that an ionomer of the invention containing at least 50% VDF, more preferably at least 80% VDF, may become excessively plasticized by the solvents imbibed within it, with concomitant loss of the physical integrity of the membrane. In some applications, it may be desirable to enhance the properties of the solvent-swollen membrane. Means available for improving the mechanical properties include: 1) Incorporation into the polymer by means known in the art, and following the synthetic pathway hereinbelow described, a non-ionic third monomer that is less solvent sensitive; 2) formation by known means of a polymer blend with a non-ionic polymer that is less solvent sensitive; 3) blending by known means of the ionomer of the invention with an inert filler; 4) blending different compositions of ionic copolymers; and 5) crosslinking.

Suitable third monomers include tetrafluoroethylene, chlorotrifluoro-ethylene, ethylene, hexafluoropropylene, trifluoroethylene, vinyl fluoride, vinyl chloride, vinylidene chloride, perfluoroalkylvinyl ethers of the formula $CF_2=CFOR_f$ where $R_f=CF_3$, $C_2F_5$ or $C_3F_6$. Preferred termonomers include tetrafluoroethylene, hexafluoropropylene, ethylene and the perfluoroalkylvinyl ethers. Termonomers are preferably present in the polymer at a concentration of up to 30 mol %.

Polymers suitable for blending with ionomers of the invention include poly(tetrafluoroethylene) and copolymers thereof with hexafluoropropylene or perfluoroalkyl vinyl ethers, poly vinylidene fluoride homopolymer and a copolymer thereof with hexafluoropropylene, polymethylmethacrylate, polyethylene oxide, and poly (vinyl chloride). A preferred composition comprises 25 to 50 weight % PVDF homopolymer blended with the VDF ionomer of the present invention. These materials are easily blended together by means common in the art such as dissolution and mixing in a common solvent such as acetone and then casting a membrane.

Suitable inert fillers include $SiO_2$, $Al_2O_3$, $TiO_2$, or $CaF_2$. Small and high surface area particles less than 1.0 micron in diameter are desired, such as are available for the preferred grade of $SiO_2$ under the trade name Cab-o-sil® TS-530 silica. Loadings of up to 50 weight % filler are preferred.

The relatively high solubility of the ionomers of the present invention and their sulfonyl fluoride precursors provides a benefit in ease of processing during fabrication of the components of a battery but may be problematical during final assembly of the desired battery product. In a preferred embodiment of the battery of the present invention, a battery is formed from one or more electrochemical cells formed by laminating together in film form the anode, cathode, and separator compositions of the present invention, all of which have been rigorously dried prior to addition of a liquid selected from the group of organic carbonates and mixtures thereof, a mixture of ethylene carbonate and dimethyl carbonate being most preferred. Organic carbonates will not only swell the ionomeric polymer, but may also dissolve the polymer depending on the composition thereof, the primary determining factor being the degree of crystallinity, which in turn is related to the concentration of ionic comonomer in the polymer. The challenge is to swell the ionomer with solvent while minimizing dissolution of the polymer.

One way to achieve the necessary balance is to use the methods hereinabove described for improving the physical integrity of the solvent-containing ionomer. Another approach comprises dissolution of the ionomer into the preferred organic carbonate solvents, followed by introduction of the resulting solution into the pores of an inert porous polymer support such as Celgard® porous polypropylene, available from Hoechst-Celanese, or Gore-Tex microporous PTFE, available from W.L. Gore Associates, Newark, Del.

The preferred electrode of the invention comprises a mixture of one or more electrode active materials in particulate form, the ionomer of the invention, at least one electron conductive additive, and at least one organic carbonate. Examples of useful anode active materials include, but are not limited to, carbon (graphitic, coke-type, mesocarbons, polyacenes, and the like) and lithium-intercalated carbon, lithium metal nitrides such as $Li_{2.6}Co_{0.4}N$, tin oxides, lithium metal, and lithium alloys, such as alloys of lithium with aluminum, tin, magnesium, mercury, manganese, iron, and zinc. Lithium intercalation anodes employing carbon are preferred. Useful cathode active materials include, but are not limited to, transition metal oxides and sulfides, lithiated transition metal oxides and sulfides, and organosulfur compounds. Examples of such are cobalt oxides, manganese oxides, molybdenum oxides, vanadium oxides, sulfides of titanium, molybdenum and niobium, lithiated oxides such as spinel lithium manganese oxides $Li_{1+x}Mn_{2-x}O_4$, chromium-doped spinel lithium manganese oxides $Li_xCr_yMn_zO_4$, $LiCoO_2$, $LiNiO_2$, $LiNi_xCo_{1-x}O_2$ where x is 0<x<1, with a preferred range of 0.5<x<0.95, $LiCoVO_4$, and mixtures thereof $LiNi_xCo_{1-x}O_2$ is preferred. A highly preferred electron conductive aid is carbon black, preferably Super P carbon black, available from the MMM S.A. Carbon, Brussels, Belgium, in the concentration range of 1–10%. Preferably, the volume fraction of the lithium ionomer in the finished electrode is between 4 and 40%.

The electrode of the invention may conveniently be made by dissolution of all polymeric components into a common solvent and mixing together with the carbon black particles and electrode active particles. For cathodes the preferred electrode active material is $LiNi_xCo_{1-x}O_2$ wherein 0<x<1, while for anodes the preferred electrode active material is graphitized mesocarbon microbeads. For example, a preferred lithium battery electrode of the invention can be fabricated by dissolving ionomer of the invention in a mixture of acetone and dimethyl-formamide, followed by addition of particles of electrode active material and carbon black, followed by deposition of a film on a substrate and drying. The resultant preferred electrode will comprise electrode active material, conductive carbon black, and ionomer of the invention, where, preferably, the weight ratio of ionomer to electrode active material is between 0.05 and 0.8 and the weight ratio of carbon black to electrode active material is between 0.01 and 0.2. Most preferably the weight ratio of ionomer to electrode active material is between 0.1 and 0.25 and the weight ratio of carbon black to electrode active material is between 0.02 and 0.1. This electrode can then be cast from solution onto a suitable support such as a glass plate or current collector metal foil, and formed into a film using techniques well-known in the art. The electrode film thus produced can then be incorporated into a multilayer electrochemical cell structure by lamination, as hereinbelow described.

It may be desirable to incorporate into the electrode composition of the invention additional polymers or solvents for such purposes as improving the binding of the components thereof, or providing improved structural integrity of an article fabricated therefrom. One particularly preferred additional material is PVDF homopolymer, which may be incorporated simply by dissolving the polymer into the same solution from which the electrode is being formed, as hereinabove described.

In an alternative process, the dispersion of electrode-active material and optional carbon black and other adjuvants can first be cast onto a surface followed by addition of the ionomer of the invention in organic carbonate solution.

The invention is further described in the following specific embodiments.

EXAMPLES

For the purposes of this invention, the term "conductivity" used herein refers specifically to ionic conductivity as determined using the so-called four-point probe technique described in an article entitled "Proton Conductivity of Nafion® 117 As Measured by a Four-Electrode AC Impedance Method" by Y. Sone et al., J. Electrochem. Soc., 143, 1254 (1996). The method as described applies to aqueous electrolyte membranes. The method was modified for purposes of obtaining the measurements reported herein for non-aqueous solvents by placing the apparatus described in a sealed glove box purged with dry nitrogen in order to minimize any exposure to water. The method was also modified by substituting parallel linear probes traversing the full width of the test specimen for the point probes employed in the published method.

A 1.0 cm by 1.5 cm film was blotted dry and positioned into the conductivity cell. Cell impedance was determined over the range of 10 Hz to 100,000 Hz, and the value with zero phase angle in the higher frequency range (usually 500–5000 Hz) was ascribed to the bulk sample resistance in Ohms. The raw resistance value was then converted to conductivity, in S/cm, using the cell constant and film thickness.

Solvent uptake was determined from the equation $$\% \text{ uptake} = (W_w - W_d)/W_d$$

where $W_d$ was the weight of the membrane prior to solvent contact and $W_w$ was the weight of the membrane after solvent contact determined after first removing membrane from solvent and then blotting it dry using a paper towel to remove excess surface solvent.

All chemicals were used as received unless stated otherwise.

Differential scanning calorimetry (DSC) was performed according to ASTM D4591, in a nitrogen atmosphere and at a heating rate of 20° C./minute, using a TA Instruments Model 2910. Thermogravimetric analysis was performed using a TA Instruments Model 2950 at a heating rate of 10° C./min in air except where otherwise noted.

$^{19}F$ NMR spectra were recorded using a Bruker AVANCE DRX 400 spectrometer. $^1H$ NMR spectra were recorded using a Bruker AVANCE DRX 500 spectrometer.

Intrinsic viscosity was determined at 25° C. in 1,2-dimethoxyethane.

Example 1

A 1-liter vertical stirred autoclave was charged with 500 ml of an aqueous solution of ammonium perfluorooctanoate (7 g), available from the 3M Company, Minneapolis, Minn., and PSEPVE (50.0 g, 0.112 mol). PSEPVE was prepared in the manner described in D. J. Connally and W. F. Gresham, U.S. Pat. No. 3,282,875 (1966). The vessel was closed, twice pressured to 100 psi nitrogen and vented, cooled to about 5° C. and evacuated. Vinylidene fluoride (50.0 g, 0.78 mol) was added, and the stirred (750 rpm) contents were heated to 60° C. A solution of 0.40 g potassium persulfate in 20 ml distilled water was added over a 20 minute interval. Pressure decreased from 400 psi to 5 psi within 2 hours. The polymer was isolated by freeze/thaw coagulation. After washing with distilled water several times, the polymer sponge was cut in several pieces, frozen in liquid nitrogen, added to a blender to produce a polymer crumb which was washed with additional portions of water. There was obtained 95.5 g of white polymer after drying at 25° C. under a vacuum of 10 millitorr. DSC showed $T_g$=−23° C. and maximum of a broad melting transition at 125° C. (8.7 J/g). TGA, performed under nitrogen showed the onset of weight loss at ca. 250° C., with ca. 1% loss up to ca. 370° C. Intrinsic viscosity was 0.72 dl/g. The composition was found to be 87 mol % VDF and 13 mol % PSEPVE, as determined by a combination of $^1H$ and $^{19}F$ NMR. The NMR results were $^1H$ NMR (THF-d8): 3.3–2.9 (lower field shoulders), 2.9–2.7 (major multiplet), 2.6 and 2.3 (minor multiplets). $^{19}F$ NMR (THF-d8) featured signals at +45.4 ($FSO_2$), −78 to −80 (m's, $OCF_2$ and $CF_3$), −90 to −95 (m, $CH_2CF_2$), −110 to −123 (series of m, for minor $CH_2CF_2$ and $CF_2S$), −144 (CF).

An 8.9 g sample of PSEPVE/VF2 copolymer (ca. 10 m equivalents of pendant sulfonyl fluoride) was suspended in methanol (50 mL), treated with lithium carbonate (0.81 g, 11 m equivalents CO$_3$), and stirred at 25° C. After 3 hr, another 50 ml methanol was added and the mixture was stirred for an additional 18 hr. The mixture was filtered under pressure through glass fiber paper. A portion of the methanol solution was used to cast films for conductivity testing and the remainder was evaporated to dryness under reduced pressure. $^{19}$F NMR (THF-d8) showed only a trace signal for residual FSO$_2$ moieties (>99% conversion), major signals at −76 to −82, −90.6, −93.1 and −95.3, −108 to −112 and series of m's at −113.6, −115.9, −117.5, −122 to −124, and −144 to −145 with integration in accord with 13 mol % incorporated lithium sulfonate form of PSEPVE. I.V.=0.73 dl/g.

Example 2

A film ca. 80 micrometers in thickness was cast from the methanol solution of Example 1, by spreading a ca. 3 mL aliquot of the solution on a glass plate at 25° C. After slow evaporation of solvent, the resulting film was then dried for a period of time in a vacuum oven.

The dried membrane was transferred to a sealed container and conveyed to a glove box having a positive pressure of dry nitrogen applied thereto, wherein the membrane was removed from the sealed container and allowed to come to room temperature. The membrane was then cut into several sections 1.0 cm by 1.5 cm in size.

Using a micropipette, 20 microliters of propylene carbonate (99%, Aldrich Chemical Co., Inc., Milwaukee, Wis.) was deposited onto the surface of the membrane sample while at room temperature. Conductivity, measured after 10 minutes of solvent exposure, was $3.74 \times 10^{-4}$ S/cm.

Example 3

A further 1.0 cm by 1.5 cm sample of the dried membrane of Example 2 was treated according to the method therein described except that the solvent was a 1:1 by volume mixture of ethylene carbonate (98%, Aldrich Chemical Co., Inc., Milwaukee, Wis.) and dimethyl carbonate (99%, Alfa Aesar, Ward Hill, Ma.). The conductivity was found to be $6.87 \times 10^{-4}$ S/cm.

Example 4

A 1.0 cm by 1.5 cm sample of the dried membrane of Example 2 was treated according to the method therein described except that the solvent was distilled and deionized water. The conductivity was equal to $2.156 \times 10^{-2}$ S/cm.

Example 5

A mixture of 1 g of the Li ionomer of Example 1 and 1 g of poly(vinylidene fluoride) homopolymer, prepared by aqueous dispersion polymerization, was placed in a closed glass jar containing 60 ml acetone. Mild heat was applied while the contents were shaken to speed dissolution. Once both polymers were dissolved, solution aliquots were deposited on a glass surface in order to form films by slow solvent evaporation. The resulting films were dried for 18 hr at 50° C. in a vacuum oven.

The dried membrane was transferred to a sealed container and conveyed to a glove box having a positive pressure of dry nitrogen applied thereto, wherein the membrane was removed from the sealed container and allowed to come to room temperature.

A 1.0 cm by 1.5 cm membrane sample was immersed fully into an excess of propylene carbonate solvent in a sealed glass vial. After 1 hour, the membrane was removed from the solvent, blotted dry, and the weight uptake and conductivity measured. The weight uptake was 267% and the conductivity was $4.95 \times 10^{-4}$ S/cm.

Example 6

A 1.0 cm by 1.5 cm sample of the membrane of Example 5 was treated according to the method therein described except that the solvent was a 1:1 by volume mixture of ethylene carbonate and dimethyl carbonate. After one hour, the weight uptake was 150% and the conductivity was $6.60 \times 10^{-4}$ S/cm.

COMPARATIVE EXAMPLE 1

A 9.0 g sample of a non-ionic copolymer was synthesized in a manner similar to that employed to synthesize the polymer of Example 1 except that the initiator was a solution of 0.08 g potassium persulfate in 20 ml water. NMR indicated a composition of 86.8 mol % VDF and 13.2 mol % PSEPVE. A 9.0 g sample of the polymer so-synthesized was placed in a flask with 100 ml of methanol and 0.9 g of lithium carbonate. The slurry was stirred at room temperature under argon for 48 hours. 500 ml of THF was then added and the solution was filtered through a fritted funnel. The filtered solution was then placed in dialysis tubing (Spectra/Por(R) Dialysis Membrane, MWCO=3500) and dialyzed against deionized water for 11 days. The dialysis tubing contents were emptied into a flask and the water removed under vacuum. The collected polymer was then dried under vacuum at 50° C. The composition of the polymer was found to be 86.8 mol % VDF and 13.2 mol % PSEPVE by a combination of $^1$H and $^{19}$F NMR.

Films were cast by dissolving 0.58 g of polymer in a minimum amount of acetone and pouring the solution into round PFA petri dishes. The solvent was allowed to evaporate slowly to yield a film that was dried further in a recirculating nitrogen oven (Electric Hotpack Company, Inc., Model 633, Philadelphia, Pa.) at T=100° C. for 48 hours. Following the drying, the membrane was immersed into an excess of 1.0 M nitric acid (Reagent grade, EM Science, Gibbstown, N.J.) and heated to T=80° C. for one hour. Following this procedure, the membrane was rinsed with deionized water for several hours. The membrane was clear and intact after this procedure.

A 1.0 cm by 1.5 cm section of this membrane sample was fully immersed into an excess of LiOH (98%, EM Science, Gibbstown, N.J.), 1.0 molar in 1:1 by volume mixture of water and DMSO (HPLC grade, Burdick & Jackson, Muskegon, Mich.) mixture at T=70° C. for 1 hour. Upon reaching temperature, this membrane sample was visibly blackened and rapidly decomposed by the hydrolysis bath. After one hour, the membrane sample had fractured into several smaller pieces and was completely blackened.

Example 7

A 1-liter vertical stirred autoclave was charged with 500 ml of an aqueous solution of ammonium perfluorooctanoate (7 g) and PSEPVE (25.0 g, 0.056 mol). The vessel was closed, twice pressured to 100 psi nitrogen and vented, cooled to about 5° C. and evacuated. Vinylidene fluoride (50.0 g, 0.78 mol) was added, and the stirred (750 rpm) contents were heated to 60° C. A solution of potassium persulfate (0.08 g in 20 ml) was added over a 10 minute interval. Pressure decreased from 400 psi to 5 psi within 3 hours. The polymer was isolated by freeze/thaw coagulation and washed thoroughly with distilled water. There was obtained 69.4 g of white polymer after drying. DSC exhibited Tg=−23° C. and maximum of a broad melting transition at 120° C. (14.9 J/g). TGA showed the onset of weight loss at ca. 370° C. The composition was found to be 91.6 mol % VDF and 8.4 mol % PSEPVE, as determined by a combination of $^1$H and $^{19}$F NMR. The NMR results were $^1$H NMR (acetone-d6): 3.6–2.6 (m), 2.4 (minor multiplet). $^{19}$F NMR (acetone-d6): +45.57 (s), –78.0 to –80.0 (m's s, a=2.968), –90.0 to –95.0 (m's, a=8.646), –108 to –116 (series of m, a=2.721), –121 to –127 (m's, a=1.004), –143 to –144.0 (m, a=0.499); integration using internal CF signal and the combined $CF_3$+$CF_2O$ signals to fix response for PSEPVE indicated 0.462/F for PSEPVE, 5.03/F for VDF.

30 g (26.2 milliequivalents) of the copolymer so produced was suspended in 300 ml methanol and treated with 2.13 g $Li_2CO_3$. The resulting mixture was stirred for 42 hours. An aliquot analyzed by $^{19}$F NMR showed >99% conversion of sulfonyl fluoride groups to lithium sulfonate moieties.

A 50 ml portion of the methanol slurry was treated with ca. 120 ml acetone, and the resulting polymer solution was filtered under pressure. The filtered solution was used to prepared several film samples for further testing after standard drying procedures. $^{19}$F NMR (acetone-d6): +45.6 (trace signal, a=below detection limits), –77.0 to –83.0 (m's, a=13.68), –88.0 to –100.0 (m's, a=38.9), –108 to –118 (series of m, a=10.78), –122 to –128 (m's, a=4.86), –144 to –145.5 (m, a=2.12); consistent with 91.6 mol % VDF, 8.4 mol % Li-PSEPVE.

TGA showed a gradual 3% weight loss to ca. 250°, followed by onset of polymer weight loss at 275° C. DSC featured a maximum of a broad melting transition at 126° C.

Comparative Example 2

A 3" by 3" sample of Nafion® 117 perfluorinated ionomeric membrane available from the DuPont Company, Wilmington Del., was exposed to an excess of LiOH (98%, EM Science, Gibbstown, N.J.), 1.0 molar in 1:1 by volume mixture of water and DMSO (HPLC grade, Burdick & Jackson, Muskegon, Mich.) mixture at T=60° C. for 2 hours, after which the membrane was washed in distilled water for 2 hours at T=80° C., and dried in a recirculating nitrogen oven (Electric Hotpack Company, Inc., Model 633, Philadelphia, Pa.) at 100° C. for 96 hours.

The dried membrane was transferred to a sealed container while still warm and conveyed to a glove box having a positive pressure of dry nitrogen applied thereto, wherein the membrane was removed from the sealed container and allowed to come to room temperature. The membrane was then cut into several sections 1.0 cm by 1.5 cm in size.

A cooled 1.0 cm by 1.5 cm membrane sample was then soaked in an excess propylene carbonate (99%, Aldrich Chemical Co., Inc., Milwaukee, Wis.) in a sealed glass vial for 2 hours at room temperature. The membrane was removed from the propylene carbonate bath, blotted with a paper towel to remove excess solvent. The conductivity was determined to be $2.16 \times 10^{-5}$ S/cm.

Example 9

0.5 g of $Li_2CO_3$-hydrolyzed ionomer prepared in the manner of Comparative Example 1 was dissolved in 15–20 ml of THF in a vial equipped with a stirring bar. 0.1 g of Cab-o-sil® TS-530 silica was added to the solution and dispersed by stirring. Films were cast into round PFA petri dishes (50 mm diameter). The solvent was allowed to evaporate slowly to yield a film that was dried further under vacuum for 48 hours at 100° C. in a vacuum oven. The resulting film was tough and easily separated from the substrate. The film was hydrolyzed to the lithium ionomer form by the method described herein. Conductivity, determined after soaking in distilled water, was $7.02 \times 10^{-3}$ S/cm.

Example 10

A 500 mL 3-neck round-bottom flask equipped with a magnetic stirring bar, 2 septa, and a water condenser further attached to a nitrogen source was charged with PSEPVE (98 g, 0.22 mol) and methanol (200 mL). The solution was stirred and lithium carbonate (16.2 g, 0.22 mol) was added in 3 portions. No exotherm was observed. The mixture was stirred 3 days at room temperature. The reaction mixture was centrifuged, then the supernatant was decanted and concentrated by vacuum distillation. Rigorous drying of the salt was accomplished by placing in a tray in a heated (80° C.) tube with a $N_2$ flow. Methanol content was 1.2 mol % (determined by $^1$H NMR in $D_2O$ with $CH_3COOH$ internal integration standard). Another sample dried in a packed tube contained 0.6% methanol. Analytical data were consistent with the structure, $LiO_3SCF_2CF_2OCF(CF_3)CF_2OCF=CF_2$. $^{19}$F NMR ($D_2O$) δ–81.1 (m, 2F), –8.15 (m, 3F), –86.3 (m, 2F), –116.0 (dd, 86.1, 65.4 Hz, 1F), –119.0 (d, 7.6 Hz, 2F), –123.8 (ddm, 112.3, 86.1 Hz, 1F), –137.8 (ddm, 112.3, 65.4 Hz, 1F), –146.4 (m, 1F); FTIR (NaCl) 1780.6 (m), 1383.3 (w), 1309.0 (vs), 1168.2 (m).

Example 11

A 1-liter vertical stirred autoclave was charged with 500 mL of an aqueous solution of the ionic olefin of Example 10 (25.0 g, 0.056 mol). The vessel was closed, twice pressured to 100 psi nitrogen and vented, cooled to about 5° C. and evacuated. Vinylidene fluoride (50.0 g, 0.78 mol) was added, and the stirred (750 rpm) contents were heated to 60° C. A solution of potassium persulfate (0.08 g in 20 mL) was added over a 10 minute interval. Pressure decreased from 400 psi to 5 psi within 8 hours. Evaporation of water from the solution of copolymer resulted in 54 g of white solid. DSC (10°/min, $N_2$) exhibited maximum of a broad melting transition at 157° C. (10.7 J/g). TGA (10°/min, $N_2$) showed a ca. 5% weight loss (40–150° C. attributed to loosely bound water) and the onset of polymer weight loss at ca. 260° C. $^1$H NMR (acetone-d6): 3.6–2.6 (m), 2.4 (minor multiplet). $^{19}$F NMR (acetone-d6): –78.0 to –80.0 (m's, a=84.9), –90.0 to –95.0 (m's, a=236.9), –108 to –116 (series of m) and –121 to –127 (m's , combined a=112.5), –144 to –145.0 (m, a=15.1); integration using internal CF signal and the combined $CF_3$+$CF_2O$ signals to fix response for Li-PSEPVE indicated 13.6/F for PSEPVE, 140.7/F for VDF. Thus, mol % VDF=91.2%; mol % Li-PSEPVE=8.8% and wt % VDF= 57.4%; wt % Li-PSEPVE=42.6%.

Example 12

Separator and Cell Utilizing p(VdF-PSEPVE)

Below is a description of a separator and an electrochemical cell which used an ionomer of the invention in the electrolyte. Both the separator and the electrode may be considered porous structures imbibed with a liquid electrolyte, the electrolyte being a mixture of the ionomer dissolved in carbonate-based liquid solvents.

The following lithiation/dialysis procedure was used for the silica-filled film example. A 9.0 g sample of the polymer of Example 1, an 87 mol % $VF_2$/13 mol % PSEPVE copolymer, was placed in a flask with 100 ml of methanol and 0.9 g of lithium carbonate. The slurry was allowed to stir at room temperature under argon for 48 hours. THF (500 ml)

was added and the solution was filtered through a fritted funnel. The solution was then placed in dialysis tubing (Spectra/Por® Dialysis Membrane, MWCO=3500 from VWR) and dialyzed against deionized water for 11 days. The dialysis tubing contents were emptied into a flask and the water removed under vacuum. The collected ionomer was then dried under vacuum at 50° C.

In an argon-filled dry box, an electrolyte solution was prepared using 200 mg of the ionomer (in lithium form) dissolved in 2 ml of a 50:50 wt:wt mixture of ethylene carbonate and dimethyl carbonate. A microporous polyolefin separator (Celgard® 3501, Hoechst Celanese) was soaked in the electrolyte for 2 hours and gained 65% in weight. Its ionic conductivity, measured using a 4-point probe, was $10^{-3}$ S/cm.

A cathode film was prepared by making a slurry containing 4 g of $Li_{1.05}Mn_2O_4$ (50 m particle size), 0.215 g of SP carbon black, 2.5 ml of 4% EPDM in cyclohexane (a solution containing 4 g of DuPont Nordel® 3681 EPDM rubber dissolved in 96 g of cyclohexane), and an additional 2.5 ml of cyclohexane. The ingredients were shaken together in a glass vial with glass beads for 15 minutes, and then the slurry was cast onto FEP film using a doctor blade with a 10 mil gate height. The solvent was allowed to evaporate at ambient temperature, giving film with a coating weight of 21 $mg/cm^2$. The cathode film was removed from the FEP base film, placed between 5-mil Kapton® sheets, and these in turn were placed between 5-mil brass foil sheets. This cathode package was then compressed between steel rollers heated to 110° C. and with a force of 2.8 lb. per inch of nip width by using a laminator (Western Magnum XRL-14, El Segundo, Calif.). Cathodes 13.6 mm dia. were punched out from the film, and these were dried in vacuum at 80° C. for 30 min.

A cathode (31.2 mg, 13.6 mm diameter) and a microporous polyolefin separator were soaked in the electrolyte solution from above for two hours. They were assembled with a 320 um thick lithium foil anode into a size 2325 coin cell. The cell was charged with constant current at 0.5 mA to a voltage of 4.3 V, at which point the voltage was held constant until the current dropped below 0.05 mA. The capacity on first charge was 3.81 mAh, which represents 131 mAh per g of lithium manganese oxide cathode material. The cell was discharged at a 0.5 mA rate to 3.7 V, and then the voltage was held constant at 3.7 V until the discharge current dropped below 0.05 mA. The discharge capacity was 3.15 mAh. The cell was repeatedly charged and discharged in a manner similar to above, with the $7^{th}$ discharge capacity being 2.96 mAh. The AC impedance of the cell was measured to be 98 ohm at a frequency of 0.01 Hz.

We claim:

1. An ionomer comprising monomer units of VDF and a perfluoroalkenyl monomer having an ionic pendant group represented by the formula:

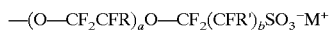
—(O—CF$_2$CFR)$_a$O—CF$_2$(CFR')$_b$SO$_3^-$M$^+$ wherein R and R' are independently selected from F, Cl or a perfluorinated alkyl group having 1 to 10 carbon atoms, a=0, 1 or 2, b=0 to 6, and M$^+$ is H$^+$ or a univalent metal cation.

2. The ionomer of claim 1 wherein R is trifluoromethyl or F, R' is F, a=0 or 1, and b=1.

3. The ionomer of claim 1 wherein M$^+$ is an alkali metal cation.

4. The ionomer of claim 2 wherein R is trifluoromethyl and a=1.

5. The ionomer of claim 3 wherein M$^+$ is a lithium cation.

6. The ionomer of claim 1 wherein the molar concentration of the ionic pendant group in the ionomer is in the range of 1–50%.

7. The ionomer of claim 1 wherein the molar concentration of the ionic pendant group in the ionomer is in the range of 2–20%.

8. The ionomer of claim 1 in the form of a film or sheet.

9. The ionomer of claim 1 further comprising up to 30 mol % of one or more additional monomer units selected from the group consisting of tetrafluoroethylene, chlorotrifluoroethylene, ethylene, hexafluoropropylene, trifluoroethylene, vinyl fluoride, vinyl chloride, vinylidene chloride, perfluoroalkylvinyl ethers of the formula $CF_2$=CFOR$_f$ where R$_f$=CF$_3$, C$_2$F$_5$ or C$_3$F$_6$.

10. The ionomer of claim 9 wherein the additional monomer units are selected from the group consisting of tetrafluoroethylene, hexafluoropropylene, ethylene, and perfluoroalkylvinyl ethers.

11. The ionomer of claim 1 further comprising a non-ionic polymer blended therewith.

12. The ionomer of claim 11 wherein the non-ionic polymer is selected from the group consisting of poly (tetrafluoroethylene) and copolymers thereof with hexafluoropropylene or perfluoroalkyl vinyl ethers, poly(vinylidene fluoride) homopolymer and a copolymer thereof with hexafluoropropylene, polymethyl-methacrylate, polyethylene oxide, and poly(vinyl chloride).

13. The ionomer of claim 12 wherein poly(vinylidene fluoride) is blended therewith, the polyvinylidene fluoride being present in the blend at a concentration in the range of 25–50% by weight of the total.

14. The ionomer of claim 1 further comprising inorganic particles admixed therewith.

15. The ionomer of claim 14 wherein the inorganic particles are silica particles of an average particle dimension of less than 1.0 micrometers, the silica being present in the admixture at up to 50% by weight of the total.

16. A process for forming an ionomer, the process comprising
contacting a polymer comprising
monomer units of VDF and a perfluoroalkenyl monomer having a
pendant group of the formula

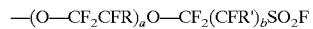
—(O—CF$_2$CFR)$_a$O—CF$_2$(CFR')$_b$SO$_2$F wherein R and R' are independently selected from F, Cl or a perfluorinated alkyl group having 1 to 10 carbon atoms, a=0, 1 or 2, b=0 to 6,
with a mixture of an alkali metal salt and a solvent for a period of time sufficient to obtain the degree of conversion desired to the alkali metal sulfonate form of the polymer.

17. An ionically conductive composition comprising the ionomer of claim 1, and a liquid imbibed therewithin.

18. The ionically conductive composition of claim 17 wherein the liquid is a protic liquid.

19. The ionically conductive composition of claim 18 wherein the liquid is water or methanol.

20. The ionically conductive composition of claim 17 wherein the liquid is an aprotic liquid.

21. The ionically conductive composition of claim 20 wherein the liquid is selected from the group consisting of organic carbonates and mixtures thereof.

22. The ionically conductive composition of claim 21 wherein the liquid is a mixture of ethylene carbonate and at least one liquid selected from the group consisting of dimethyl carbonate, methyl ethyl carbonate and diethyl carbonate.

23. The ionically conductive composition of claim 17 wherein R is trifluoromethyl, a=1, M$^+$ is a lithium cation, the molar concentration of the ionic pendant group in the ionomer is in the range of 2–20%, and the liquid is selected form the group consisting of organic carbonates and mixtures thereof.

24. The ionically conductive composition of claim 17 in a form selected from the group consisting of a film, sheet and gel.

25. The ionically conductive composition of claim 24 further comprising a microporous electrically insulating polymer film or sheet within the micropores of which the gel is imbibed.

26. An electrode comprising at least one electrode active material, the ionomeric polymer of claim 1 mixed therewith, and a liquid imbibed therewithin.

27. The electrode of claim 26 wherein R is trifluoromethyl, a=1, M$^+$ is a lithium cation, the molar concentration of the ionic pendant group in the ionomer is in the range of 5–20%, and the liquid is selected form the group of organic carbonates and mixtures thereof.

28. The electrode of claim 26 wherein the weight ratio of ionomer to electrode active material is between 0.05 and 0,8 and the weight ratio of carbon black to electrode active material is between 0.01 and 0.2.

29. An electrochemical cell comprising a positive electrode, a negative electrode, a separator disposed between the positive and negative electrodes, and a means for connecting the cell to an outside load or source wherein at least one of the group consisting of the separator, the cathode, and the anode, comprises the conductive composition of claim 17.

* * * * *

UNITED STATES PATENT AND TRADEMARK OFFICE
CERTIFICATE OF CORRECTION

PATENT NO. : 6,025,092
DATED : FEBRUARY 15, 2000
INVENTOR(S) : CHRISTOPHER MARC DOYLE ET AL.

It is certified that error appears in the above—identified patent and that said Letters Patent is hereby corrected as shown below:

On the title page item [57],
Delete the current text of the abstract and replace that text with:

-- This invention concerns ionomers comprising a substantially fluorinated, but not perfluorinated, polyethylene backbone having pendant groups of fluoroalkoxy sulfonic acids and the metal salts thereof, and with the uses of said ionomers in electrochemical applications such as batteries, fuel cells, electrolysis cells, ion exchange membranes, sensors, electrochemical capacitors, and modified electrodes.--

Signed and Sealed this

Thirtieth Day of January, 2001

*Attest:*

Q. TODD DICKINSON

*Attesting Officer*  *Director of Patents and Trademarks*